Dec. 21, 1965   L. CAHN   3,224,517
ELECTROMAGNETIC BALANCE
Filed Feb. 27, 1963
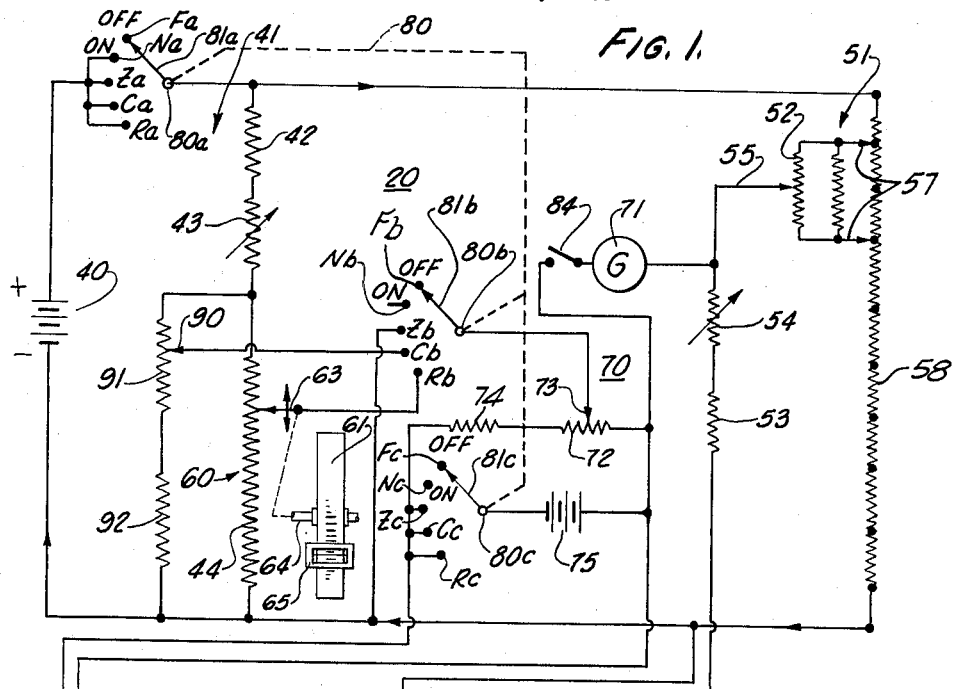
FIG. 1.
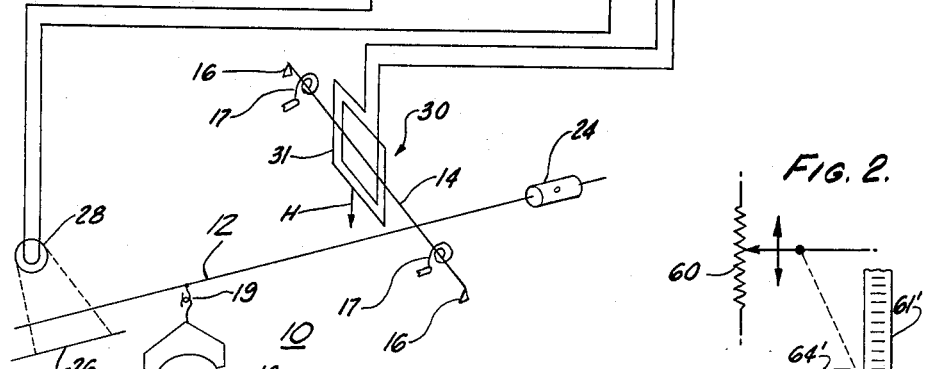
FIG. 2.
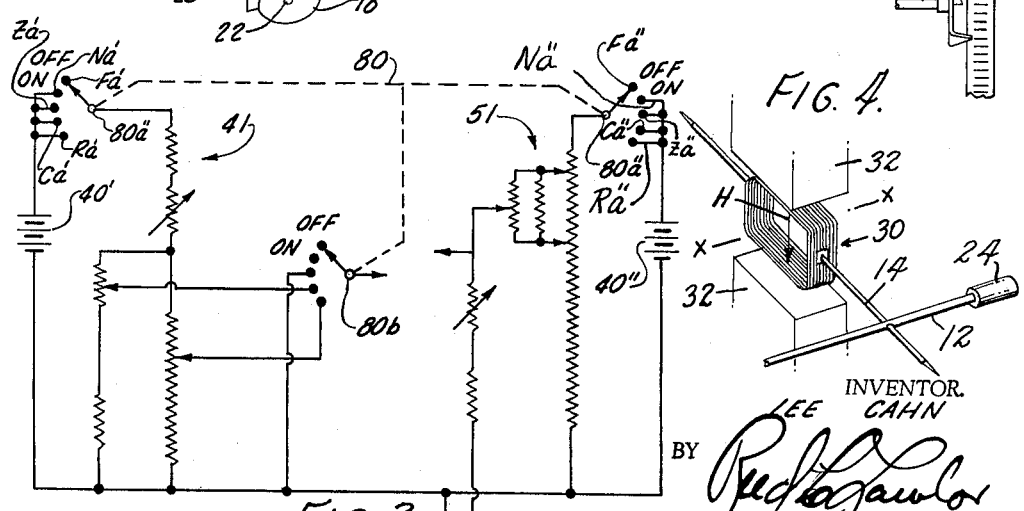
FIG. 3.
FIG. 4.
INVENTOR.
LEE CAHN
BY
ATTORNEY

3,224,517
ELECTROMAGNETIC BALANCE
Lee Cahn, 2404 Moreno Drive, Los Angeles 39, Calif.
Filed Feb. 27, 1963, Ser. No. 261,254
11 Claims. (Cl. 177—210)

This invention relates to improvements in microbalances of the electrical type. This application is a continuation-in-part of my copending patent application Serial No. 641,623, now abandoned.

Previous microbalances have been of two types; namely, mass comparison balances and spring balances.

In a mass comparison balance, weights are added or removed to balance the moment produced by the sample. This type of balance suffers from the following disadvantages among others:

(a) Relatively large standard masses may be required to perform the weighing, which in turn require a heavy beam construction. This amount of mass will have a relatively high moment of inertia, resulting in a slow balancing action of long period. The large masses also load the beam bearings, thus increasing friction and reducing sensitivity.

(b) Where *small masses* are involved, the addition or subtraction of a very small mass becomes prohibitively difficult. A mass of one microgram is too small to handle with any degree of convenience, and almost impossible to make. If larger masses are used, and fine adjustment of their moment is achieved by moving them, a limit is reached as to the precision with which they can be located on a beam, and the locating means adds excessive weight to the beam, with the disadvantages noted in (a) above.

In a spring balance, the moment contributed by the sample is balanced by the deflection of a spring or other elastic or yieldable member. Such balances are subject to the following disadvantages, among others:

(a) They do not measure mass, but only force, in general. For this reason, mass determinations may be in error by the variation of the acceleration of gravity over the surface of the earth. This variation amounts to approximately 0.5% over the inhabited section of the earth. Springs are rarely perfectly linear. In practice, the force produced by a spring varies from strict proportionality with deflection by 1% of full scale.

(b) In general, the slope of the force-deflection line of a spring varies with temperature.

(c) If springs are allowed to deflect, they are frequently quite fragile.

There have been attempts in the past to overcome these disadvantages by using electromagnetic force to balance the moment due to the sample. For this purpose, use has been made of magnetic forces generated by currents flowing in a coil attached to the fixed part of the balance. Such a system has advantages over the two principal methods heretofore used, because small increments of current can be added or subtracted with ease. In spite of this, such arrangements add considerable weight and moment of inertia to the beam, and introduce an uncertainty as to the line of action of the force and thus to its exact moment.

Similar problems arise when the coil is mounted at some distance from the axis of rotation of the beam and the magnetic material attached to the fixed portion of the balance. For these reasons, no electromagnetic balance is manufactured commercially.

An object of the present invention is to provide an electromagnetic balance in which the inertia and weight of the apparatus are minimized.

Another object of the invention is to provide novel circuits for the rapid and accurate measurement of the balancing current.

Another object is to provide a simple arrangement for zeroing the scale reading for calibrating the full scale reading and for providing a linear indication of variations in weight.

Another object is to provide a device for the measurement of force and mass that will rapidly and accurately weigh sample materials within its range.

A further object is to furnish an improved apparatus having a balance beam, stirrup and pan of light mass, said parts being sturdy enough for normal handling and some abuse, yet so light that they do not apply excessive gravitational or accelerational forces to the beam.

The unique design and construction combination of the microbalance of this invention provides substantial advantages in ruggedness and in speed and convenience of operation over previous instrumentation.

With the foregoing and other objects in view, this invention resides in the combinations, arrangements and relationships of elements as set forth in the following specification, taken in connection with the drawing, wherein:

FIGURE 1 is a schematic drawing of a microbalance embodying the invention;

FIG. 2 is a detailed drawing of a part of the potentiometer;

FIG. 3 is a partial wiring diagram of an alternative embodiment of the invention; and FIG. 4 is a perspective diagram of the torque motor.

A weighing system embodying this invention includes a balance 10 and a measuring system 20. The balance 10 includes a beam member or beam 12 mounted on a shaft 14 which is rotatable about a horizonal axis, as by means of horizontally spaced apart pivot points 16. A weighing pan 18 supported from a hook 19 near one end of the beam 12 is employed for supporting an object 22 to be weighed. A counterbalance 24 is positioned at the other end of the beam 12.

Balance indicating means, such as a fiducial line or marker 26 and a light 28 which are located on opposite sides of one end of the beam 12, are employed to indicate when the weighing system is in balance. Such balance occurs when one end of the beam 12 is in a predetermined position on a line between the light 28 and the fiducial line 26, as indicated by alignment of the image of the beam 12 with the fiducial line. Springs 17 connected to the shaft 14 tend to restrain the rotation of the balance in one direction or the other when an object 22 is placed on or removed from the pan 18.

In this weighing system, a torque motor 30 is employed to apply a torque to the balance beam in opposition to a torque applied by the weight of the object 22. Thus the torque provided by the motor 30 is employed to bring the beam to the balance position.

The torque motor includes a coil 31 mounted for rotation about a horizontal axis. Though the motor is shown as though mounted on the shaft 14, in practice the coil is mounted by ribbon or pivot bearings on opposite sides. Suitable means are provided for applying a strong magnetic field H to the coil in a direction which has a component perpendicular to the axis of the coil. In accordance with this invention, current is supplied to the torque coil 31 in an amount to provide the torque which opposes and balances the torque produced by the weight of the object 22. This current is measured by means of a precision potentiometer in the measuring circuit 20 to provide an indication of the mass of the object. In practice the current is conducted to the coil through the springs 17.

The axis X—X of the torque coil 31 extends transversely of the length of the shaft 14, as indicated in FIG. 4. The magnetic field H may be supplied by any suitable means, such as a magnet having oppositely polarized magnetic pole pieces 32, 32 located on opposite sides of the shaft 14.

With this system, the torque applied by the springs 17 when the beam 12 is in the balance position, is always the same irrespective of the weight of the object on the pan. Furthermore, so long as the strength of the magnetic field component H is constant, the torque provided by the torque motor 30 is proportional to the current flowing through the torque coil 31 and does not depend in any way upon the fact that the effective strength of the magnetic field varies with changes in the angular position of the coil. Thus with this invention, no account need be taken of the force-deflection characteristic of the springs, or of inhomogeneities in the magnetic field.

In the measuring circuit, a potential source, such as a battery 40, is employed to supply current both to the torque coil 31 and to a mass-indicating precision potentiometer 60. Additional elements are included in the measuring circuit 20 in order to zero the circuit, to calibrate the circuit, and to operate the circuit to perform a weighing operation. More particularly, a ganged switch 80 having three decks 80a, 80b, and 80c is employed to set the circuit in any one of five conditions corresponding to the five contacts on each deck, as more fully explained later. Each of the three switch decks 80a, 80b, and 80c has a corresponding switch arm 81a, 81b, and 81c respectively, all of which are turned together to selectively contact the respective "Off" taps Fa, Fb, and Fc, or the respective "On" taps Na, Nb, and Nc, or the respective zeroing taps Za, Zb, and Zc, or the respective calibrating taps Ca, Cb, and Cc, or the corresponding "Read" taps Ra, Rb, and Rc respectively. As is apparent from the drawing, not all of the taps are actually used. It is to be noted that the contacts Na, Za, Ca, and Ra of the switch deck 80a are all connected to the positive terminal of the battery 40. Thus switch 80a is closed when the arm 81a contacts any of the taps Na, Za, Ca, and Ra. It is also to be noted that the contacts Nb and Nc of the switch decks 80b and 80c are idle. It is also to be noted that the contacts Zb, Cb, and Rb of the switch deck 80b are connected respectively to the negative terminal of the battery 40, the wiper arm 90 of a potentiometer 91, and the wiper arm 63 of potentiometer 60. It is also to be noted that the three contacts Zc, Cc, and Rc, of switch deck 80c are connected to one end of the light 28 and to one end of a resistor 74. Thus switch 80 is closed when the arm 81c contacts any of the taps Zc, Cc, and Rc.

It is to be noted that the torque coil is close to the axis of rotation, being symmetrically located with respect to it so that it applies a pure couple to the balance. Since the magnetic field is powerful, a considerable torque is obtained with a lightweight coil and low currents. The torque is proportional to the magnitude of the current flowing in the torque coil and to the strength of the magnetic field.

To simplify the explanation of the operation, first consider the connections that exist and the operation which occurs when the switches 80a, 80b, and 80c are connected in the "Read" position, in which the switch arms 81a, 81b, and 81c contact the taps Ra, Rb, and Rc respectively. In this condition, the battery 40 is connected across a mass-indicating circuit 41 which includes a fixed resistor 42, a calibrating resistor 43, and the winding 44 of the mass-indicating potentiometer 60, all connected in series. In this condition, the battery 40 is also connected across a torque-current circuit 51 which includes a potential divider 52 and tapped resistor 58.

One end of the torque coil 31 is connected to the negative end of the battery 40. The other end of the torque coil 31 is connected through a fixed resistor 53 and a range adjusting resistor 54 to the sliding contact or wiper arm 55 of the potential divider 52. The potential divider 52 is adjustably located on a potential range selector that is in the form of multiple tap resistor 58 that is connected across the battery 40 when the switch 80a is closed. Resistors 53 and 54 constitute a current metering or range-selecting resistor in the sense that they meter or adjust the maximum amount of current that can flow through the torque coil 31 when any specific voltage is supplied by the potential divider 52. The resistors 53 and 54, when set, form a constant impedance across which a voltage is developed that is proportional to the current flowing through the torque coil 31. The current flowing through the torque coil 31 and hence the torque applied by the coil to the balance beam 12 is varied by moving the wiper arm 55 along the potential divider 52, or by moving the contacts 57 along the tapped resistor 58. Adjustment of the contacts 58 provides a coarse adjustment while the adjustment of the wiper arm 55 provides a fine adjustment.

One end of the winding 44 of the mass indicating potentiometer 60 having a linear indicating scale is connected directly to the negative terminal of the battery 40, while the other end is connected to the positive terminal through the resistors 42 and 43. Numerous arrangements for providing linearity are well known. In one, a dial, represented by the element 61, that bears the linear scale is on the shaft 64 that carries the wiper arm 63 of the potentiometer. This dial moves past a stationary indicating marker 65. In another, represented in FIG. 2, the dial 61 remains stationary and a pointer attached to the shaft 64' carrying the wiper arm moves over the dial 61' as the wiper arm is moved along the length of the potentiometer. In either event, the potentiometer is of the precision type and its resistance between either end and the wiper arm 63 is a linear function of shaft and wiper arm movement. With this arrangement, when the measuring system is properly adjusted and operated as described below, the mass of an object 22 being weighted is indicated directly by the dial 61, in any mass ranges for which the measuring circuit may be set.

It is to be noted that the mass-balancing circuit 51 and the mass measuring circuit 41 are coupled by means of a circuit that includes the lower variable portion of the mass-indicating potentiometer 60 and also includes the range setting resistors 53 and 54 and in addition includes the zero-indicating galvanometer 71 and taring or zeroing potentiometer 72.

To make a measurement, use is made of a null-detecting circuit 70 that is connected between the wiper arm 55 of the potential divider 52 and the moving arm 81b of the switch deck 80b thus being connected to wiper arm 63 of the potentiometer 60 when the switch 80 is in the "Read" position. The null-detecting circuit 70 includes a galvanometer 71 and a zeroing potentiometer 72 that are connected in series.

The potential supplied by the zeroing potentiometer 72 is determined by the battery 75, which is connected across the potentiometer 72 through resistor 74 when the switch 80c contacts any of the taps Rc, Cc, or Zc. At the same time that current is supplied to the potentiometer 72 from battery 75, a circuit is also completed to an indicator light 28. The manner in which the potentiometer 72 is adjusted is explained hereinafter.

Assuming that the measuring circuit 20 has been properly zeroed and calibrated, the weight of an object 22 is measured by the following procedure. First of all, the ganged switches are placed in their "Read" positions; in which the switch arms 81a, 81b, and 81c contact the taps Ra, Rb, and Rc respectively; and the switch 84 may be closed. For illustration, assume that the beam 12 is initially in the balance position in which it is on line between the light 28 and fiducial line 26. The object to be weighed is then placed on the pan 18 and the measuring circuit is then manipulated to determine the weight of the object. When the object 22 is placed on the pan, the beam 12 is displaced in a counter-clockwise direction from the balanced position. Slider 55 is then moved on the potential divider 52 to vary the current flowing through the torque coil 31 so as to produce a torque which restores the beam 12 to its balanced position. Switch 84 is now closed if it has not already been closed. While the current flowing through the coil has that value, the shaft 64 and dial 61 of the potentiometer 60 are rotated, causing the wiper arm 63 to move to such a position on the potentiometer winding 44 that the voltage between the wiper arm 63 and the lower end of the potentiometer winding 44 balances the potential existing across the coil 31 and the resistors 53 and 54 by virtue of the current flowing through the torque coil 31. The voltage balance is indicated by a zero reading of the galvanometer 71. When this voltage balance is achieved, the mass of the object 22 is read directly on the dial 61. The condition of voltage balance is achieved when no current flows through the galvanometer 71. In this balanced condition, the sum of the voltages supplied by mass indicating potentiometer 60 and zeroing potentiometer 72 equals the voltage across the range adjusting resistors 53 and 54 and coil 31. The manner in which the measuring circuit 20 is zeroed and calibrated to make such direct reading possible is described hereinafter.

Prior to making a measurement, the instrument is prepared for operation by a zeroing operation and a calibrating operation.

In one way of preparing the instrument to measure the mass of an object, the switch 80 is first set at the "Read" position where the moving arms 81a, 81b, and 81c contact the taps Ra, Rd, and Rc respectively. While the switch is in this position, the battery 40 is connected to the circuit, thereby causing current to flow through the measuring circuit 41 and the torque-current circuit 51. At the same time, switch 84 is closed, thereby connecting the galvanometer 71 and a portion of the zeroing potentiometer 72 in series between the wiper arm 63 of the mass indicating potentiometer 60 and the wiper arm 55 of the balancing potentiometer 52. With the circuit so connected and with the pan 18 which is to be used in making a measurement suspended from the hook 19, the mass indicating potentiometer 60 is set in its zero condition, that is, the condition in which the dial 61 reads zero. In effect, this occurs when the wiper arm 63 is at the lower end of the potentiometer winding 44. The range-setting resistor 54 is then adjusted to such a value that the maximum current that can flow through the torque coil 31 is slightly higher than that which corresponds to the weight of the maximum mass to be measured. The wiper arm 55 is then moved to such a position that the beam 12 is in its balanced position thus taring the microbalance.

With the beam so balanced and with the mass indicating potentiometer 60 and the resistor 54 so set, and with switch 84 in the null-detecting circuit 70 closed, the current flowing through the galvanometer 71 is noted. If this current is not zero, the wiper arm 73 of the zeroing potentiometer 72 is adjusted in order to zero this current. In this zeroing operation, it is to be noted that the potential supplied by the zeroing potentiometer 72 and the potential appearing across the torque coil 31 and the range-setting resistors 53 and 54 are made equal.

Zeroing may also be accomplished by setting the switch 80 in the zero position where the moving arms 81a, 81b, and 81c make contact with the taps Za, Zb, and Zc respectively. In this condition, the null-detecting circuit is connected to the lower end of the potentiometer winding 44 making it unnecessary to move the wiper arm 63 to the lower end of potentiometer 60 to accomplish the zeroing operation.

After the instrument has been tared and zeroed with a specific weighing pan 18 in place, it is calibrated. To achieve the calibration for a given range such as 10 mg., a mass of corresponding known value, such as a standard weight of 10 mg., is placed on pan 18, and the switch 80 is turned to the "Read" position, if not already there.

When the mass is added, the beam 12 moves from its balance position. While the circuit is so connected with the 10 mg. object in place, the dial 61 of potentiometer 60 is set at the 100% or 10 mg. position. If the full scale setting is to be 1 mg. or 100 mg. the same 100% setting is used and a standard weight of 1 mg. or 100 mg. respectively is placed on the pan 18. The wiper arm 55 is then moved to a point at which the current is supplied to the torque coil 31 reestablishing the beam at its balance position. If necessary, the contacts 57 are also moved on the tapped resistor 58 as a preliminary step to final balancing by movement of the wiper arm 55. The calibrating resistor 43 is then adjusted to cause the voltage supplied by the potentiometer 60 at its wiper arm 62 to equal the increase in voltage at the wiper arm 55 of the potentiometer 52. Such equality is detected by closing the switch 84 and noting whether a current is flowing through the galvanometer 71. If it does, calibrating resistor 43 is adjusted to zero this current. Incidentally, it is to be noted that manipulation of the calibrating resistor 43 does not affect the setting of the zeroing potentiometer 72. For this reason, there is no undesirable interaction between the zeroing potentiometer 72 and the calibration resistor 43.

In summary, a typical operation of the electromagnetic balance may be described briefly as follows. With the power turned on and switch 84 open and with the weighing pan in place but without an object on the pan, the range setting resistors 53 and 54 and the torque balancing circuit 51 are adjusted to bring the end of the beam 12 to its balance position. The adjustment of the range setting resistors 53 and 54 may be made on a trial and error basis. After the scale has been balanced with no object in the pan, the switch 84 is closed and the switch 80 is moved to its "zero" position. Then the potentiometer 72 is adjusted to provide a voltage sufficient to bring the reading of the galvanometer 71 to zero. Then a calibrating mass is placed in the pan and the potentiometer 60 is set at its 100% point. The torque balancing circuit is adjusted to bring the beam 12 to its balance position again. Thereupon the switch 80 is moved to its "Read" position and the calibrating resistor 43 is adjusted to cause the galvanometer 71 to read zero again. After the calibrating mass is removed, the system is ready for weighing an object.

When the object to be weighed is placed on the pan, the torque balancing circuit 51 is adjusted to bring the beam 12 to its balance position again. Then with the switch 84 closed, and the switch 80 in its "Read" position, the wiper arm 73 is moved to the point where the galvanometer 71 again indicates that zero current is flowing. At this time the dial reading indicates the mass of the object that was being weighed. If, for some reason, the balance cannot be attained within the range of operation of the potentiometer 60, the rheostat 54 is adjusted and the process is repeated.

In an alternative way of calibrating, the switch 80 is set in the calibrating position in which the arms 81a, 81b, and 81c contact the taps Ca, Cb, and Cc. In this position the galvanometer circuit is connected between the wiper arm of the potentiometer 52 and a wiper arm 90 of a standard weight setting potentiometer 91 and an associated resistor 92 that are connected in series across the potentiometer winding 44. In this case, too, calibrating rheostat 43 is also adjusted to cause a zero current in the galvanometer 71. In order to make use of such a standard weight setting potentiometer, the wiper arm 90 is set in the 100% position in the factory and is thereafter not disturbed by the user. In practice, the wiper arm is often replaced by a solder connection with a fixed point on the standard weight setting potentiometer to make assurance that the setting of the potentiometer 91 will not be disturbed by the user.

In any event, when the measuring circuit 20 has been tared and zeroed with respect to a specific weighing pan 18 and has been calibrated, an object 22 to be weighed is placed on the pan. The switch 80 is then set in the "Read" position and the actual weighing is accomplished as previously described.

In the weighing operation, the calibrating weight is replaced by the object to be weighed, the wiper arm 55, and if necessary also the contacts 57, is moved to restore the beam to its balanced position, and the wiper arm 63 is moved to such a position that zero current flows in the galvanometer circuit. During the weighing, resistors 54 and 43 and potentiometer 72 are left at the previous settings. The weight is then read on the potentiometer scale of dial 61.

While the invention has been described as employing only one battery 40 to supply current to the torque balancing circuit 51 and to the mass measuring circuit 41, it will be understood that a separate battery may be employed for each of them without departing from the principles of this invention. In the event that two such batteries 40' and 40" are employed, suitable switches 80a' and 80a" are ganged with the switch 80b for connecting both batteries simultaneously to the respective circuits 41 and 51 as indicated in FIG. 3. These switches 80a' and 80a" are both of the same construction and function in the same manner as the switch 80a. Thus switch 80a' comprises contacts Fa', Na', Za', Ca', and Ra', and switch 80a" comprises contacts Fa", Na", Za", Ca", and Ra", corresponding respectively to the contacts Fa, Na, Za, Ca, and Ra of switch 80a.

From the foregoing, it is apparent that I have provided an improved instrument that is practical and efficient. It will be understood that changes may be made in the size, shape, materials and that equivalents may be substituted for various elements within the spirit of the invention and the scope of the appended claims.

The invention claimed is:

1. In a weighing system that includes a balance having means for supporting an object to be weighed to displace a member from a neutral position with a force applied thereto in one direction by said object and also including a magnetic force generating means comprising a coil for moving said member in the opposite direction with a force proportional to the current that flows through said coil, and also including a potential source, the combination therewith of:

a resistor connected in series with said coil;
means for adjusting the magnitude of the current that flows through said resistor and through said coil to cause said magnetic force generating means to supply a force to said member in opposition to the force produced thereon by such object and to develop a voltage across said resistor that varies in accordance with the magnetic force;
indicating means responsive to a potential difference;
a mass-indicating potentiometer and a rheostat connected in series across said potential source; and
means including an adjustable contact movable between the ends of said potentiometer for connecting said indicating means and a selected portion of said potentiometer in a circuit in series with said resistor;
said potentiometer having an indicator dial operatively associated with said movable contact for indicating the setting of said contact on said potentiometer, whereby the mass of said object may be indicated.

2. A weighing system as defined in claim 1 wherein said indicating means includes a current indicator having a zero-current indicating means, said weighing system comprising an auxiliary potentiometric means for setting said current indicator in a zero-current indicating condition when no object is being weighed.

3. In a weighing system that includes
a balance having a member that is rotatable about an axis and also having means for supporting an object to be weighed from a point on said member remote from said axis;
a torque motor including a coil for rotating said member when a current flows through said coil,
said member being displaced from a predetermined balance position, except when the torque produced by said motor is in balance with the torque produced by such object; and
means for indicating when said balance member is in said balance position;
the combination therewith of
an impedance element;
a series circuit comprising said impedance element and said coil;
means including a current source connected to said series circuit for adjusting the magnitude of the current flowing through said coil and said impedance element to equalize the torque produced by said motor and the torque produced by an object to be weighed; and
an adjustable voltage supply and a potential measuring means connected in series across said impedance element.

4. In a weighing system that includes a balance having a means for supporting an object to be weighed to displace a member from a neutral position with a force applied thereto in one direction by said object and also including a magnetic force generating means comprising a coil for moving said member in the opposite direction with a force proportional to the current that flows through said coil from a current source, the combination therewith of:

a resistor connected in series with said coil;
means connected to said current source for adjusting the magnitude of the current that flows from said current source through said resistor to cause said magnetic force generating means to supply a force to said member in opposition to the force produced thereon by such object;
indicating means responsive to a potential difference;
adjustable potentiometric means including a resistance means and a movable contact engaging said resistance means to vary the part of said resistance means between said contact and one end of said resistance means, said contact having an indication dial associated therewith for producing an indication related to the resistance of said part of said resistance means between said contact and said one end; and
coupling circuit means connecting said indicating means in series with said resistor and said part of said resistance means.

5. A weighing system as defined in claim 4 including second adjustable potential supply means connected in said coupling circuit for setting said indicating means in a predetermined condition corresponding to a predetermined weight condition corresponding to a predetermined weight condition of said balance.

6. In a weighing system that includes
a potential source,
a balance having a beam mounted on a shaft that is rotatable about an axis and having spring means connected to said shaft for restraining such rotation, and also having means for supporting an object to be weighed from a point on said beam remote from said axis, whereby said object applies a torque to urge said shaft to rotate in one direction,
a torque motor including a coil on said shaft to apply a torque to urge said beam to rotate in the opposite direction when a current of predetermined polarity flows from said potential source through said coil,
said beam being displaced from a predetermined zero position except when the torque produced by said motor is in balance with the torque produced by such object; and means for indicating when said balance beam is in said zero position;

the combination therewith of:

an adjustable resistor in series with said coil;

means connected to said potential source for adjusting the magnitude of the current flowing from a conductor on one side of said potential source through said coil and said resistor to a conductor at the other side of said potential source while the adjustment of said resistor remains fixed;

a mass-indicating potentiometer and a rheostat connected in series across said potential source, one end of said potentiometer being connected to said other conductor, said potentiometer having an adjustable contact movable between the ends thereof for selecting an adjustable measuring voltage, said potentiometer having an indicator dial for indicating the magnitude of the voltage existing between said movable contact and said other conductor;

said rheostat being connected between said one conductor and the end of said mass-indicating potentiometer that is electrically remote from said other conductor;

a null-indicating circuit connected between said movable contact and the end of the series circuit that includes said first resistor and said coil which end is remote from said other conductor, said null-indicating circuit including a galvanometer, a zeroing potentiometer, and a voltage source associated with said zeroing potentiometer.

7. In a weighing system that includes:

a balance having a member that is rotatable about an axis and also having means for supporting an object to be weighed from a point on said member remote from said axis;

a torque motor including a coil for rotating said balance beam when a current flows through said coil, said member being displaced from a predetermined balance position except when the torque produced by said motor is in balance with the torque produced by such object; and means for indicating when said balance beam is in said balance position;

the combination therewith of:

circuit means including said coil, a current source, and a constant impedance element;

means connected to said circuit means for adjusting the magnitude of the current flowing in said circuit means to vary the torque supplied by said coil and the voltage across said impedance element proportionally;

a mass-indicating potentiometer having an adjustable contact movable between the ends thereof, said potentiometer having an indicating dial; and a zeroing and coupling circuit comprising null-indicating means and an adjustable voltage source connected in series with said impedance element and the variable portion of said mass-indicating potentiometer, said adjustable voltage source being adjustable to reduce the current in said zeroing and coupling circuit to zero when said beam is in said balance position without such object in place and said mass-indicating potentiometer indicates zero, whereby with said adjustable voltage source so adjusted, the indication of said mass-indicating potentiometer is proportional to the weight of an object thereafter supported by said rotatable balance member.

8. In a weighing system that includes a balance having a balance beam that is rotatable about an axis and also having means for supporting an object to be weighed from a point on said beam remote from said axis;

a torque motor including a coil for rotating said balance beam when a current flows through said coil, said beam being displaced from a predetermined balance position except when the torque produced by said motor is in balance with the torque produced by such object; and means for indicating when said balance beam is in said balance position;

the combination therewith of circuit means including said coil, a current source, and a constant impedance element;

means connected to said circuit means for adjusting the magnitude of the current flowing in said circuit means to vary the torque supplied by said coil and the voltage across said impedance element proportionally;

a potential source;

a mass-indicating precision potentiometer having an adjustable contact movable between the ends thereof, said potentiometer having a linear indicating dial;

a zeroing and coupling circuit comprising null-indicating means and an adjustable voltage source connected in series with said impedance element and the variable portion of said mass-indicating potentiometer, said adjustable voltage source being adjustable to reduce the current in said zeroing and coupling circuit to zero when said beam is in said balance position without such object in place and said mass-indicating potentiometer indicates zero, whereby with said adjustable voltage source so adjusted, the indication of said mass-indicating potentiometer is proportional to the weight of an object thereafter supported by said rotatable balance member; and an adjustable impedance interconnecting said potential source and said precision potentiometer for establishing the calibration thereof.

9. In a weighing system that includes a balance having a means for supporting an object to be weighed to displace a member from a neutral position with a force applied thereto in one direction by said object, and also including a magnetic force generating means comprising a coil for moving said member in the opposite direction with a force proportional to the current that flows through said coil from a current source, the combination therewith of:

a resistor connected in series with said coil;

means connected to said current source for adjusting the magnitude of the current that flows from said current source through said resistor without changing the resistance of said resistor to cause said magnetic force generating means to supply a force to said member in opposition to the force produced thereon by such object;

indicating means responsive to a potential difference;

two adjustable potentiometric means, each comprising a resistance means and a wiper arm movable therealong, said two resistance means being connected in parallel;

adjustable means for applying a voltage across said two resistance means;

switch means for selectively connecting one terminal of said indicating means to one of said wiper arms; and circuit means connecting said resistor in circuit between the other terminal of said indicating means and a junction at one end of said two resistance means.

10. In a weighing system that includes a balance having a means for supporting an object to be weighed to urge a member from a neutral position with a force applied thereto in one direction by said object, and also including a magnetic force generating means comprising a coil for urging said member in the opposite direction with a force proportional to the current that flows through said coil from a current source, the combination therewith of:

a resistor connected in series with said coil;

means for adjusting the magnitude of the current that flows from said current source through said resistor without changing the resistance thereof to cause said magnetic force generating means to supply a force to said member in opposition to the force produced thereon by such object;

indicating circuit means responsive to a potential difference, said indicating circuit means comprising a current detector and an adjustable potential supply means connected in series;

adjustable potentiometric means providing an adjustable voltage; and switch means having two selectable conditions for selectively connecting said indicating circuit means across a circuit that includes said resistor in one of said conditions and across both said last mentioned circuit and said potentiometric means in the other of said conditions.

11. In a weighing system that includes a balance having means for supporting an object to be weighed to displace a member from a neutral position with a force applied thereto in one direction by said object and also including a magnetic force generating means comprising a coil for moving said member in the opposite direction with a force proportional to the current that flows through said coil, and also including a current source, the combination therewith of:

circuit means including said coil connected across a current source, said circuit means having an electrical resistance;

means for adjusting the magnitude of the current that flows from said current source through said resistance to cause said magnetic force generating means to supply a force to said member in opposition to the force produced thereon by such object and to develop a voltage across said resistance that varies in accordance with the magnetic force;

indicating means responsive to a potential difference;

a mass-indicating precision potentiometer and a rheostat connected in series across said potential source; and means including an adjustable contact movable between the ends of said potentiometer for connecting said indicating means and a selected portion of said potentiometer in a circuit that includes said resistance whereby said indicating means indicates when a voltage across said selected portion of said potentiometer balances the voltage across said resistance;

said potentiometer having a linear indicator dial operatively associated with said movable contact for indicating the setting of said contact on said potentiometer, whereby the mass of said object may be indicated by the setting of said dial.

References Cited by the Examiner

UNITED STATES PATENTS

| | | | |
|---|---|---|---|
| 1,717,462 | 6/1929 | Nagaoka et al. | 177—210 |
| 2,081,367 | 5/1937 | Nicolson | 177—210 |
| 2,108,575 | 2/1938 | Benedict | 177—264 X |
| 2,124,968 | 7/1938 | Ahrndt et al. | 177—264 |
| 2,357,891 | 9/1944 | Granberry | 177—210 X |
| 2,630,007 | 3/1953 | Howe et al. | 177—210 X |
| 2,635,463 | 4/1953 | Pouradier et al. | 177—210 X |
| 2,734,735 | 2/1956 | Payne | 177—212 |
| 2,766,981 | 10/1956 | Lauler et al. | 177—211 |
| 2,827,787 | 3/1958 | Kroeger | 177—210 X |
| 2,874,951 | 2/1959 | Gilbert | 177—212 |

FOREIGN PATENTS 865,215   2/1953   Germany.

LEO SMILOW, *Primary Examiner.*